US012553332B2

(12) United States Patent
Muller

(10) Patent No.: US 12,553,332 B2
(45) Date of Patent: Feb. 17, 2026

(54) MONITORING A HAZARDOUS WASTE REPOSITORY FORMED IN A DRILLHOLE

(71) Applicant: Deep Isolation, Inc., Berkeley, CA (US)

(72) Inventor: Richard A. Muller, Berkeley, CA (US)

(73) Assignee: Deep Isolation, Inc., Berkeley, CA (US)

( * ) Notice: Subject to any disclaimer, the term of this patent is extended or adjusted under 35 U.S.C. 154(b) by 96 days.

(21) Appl. No.: 18/698,832

(22) PCT Filed: Oct. 6, 2022

(86) PCT No.: PCT/US2022/045878
§ 371 (c)(1),
(2) Date: Apr. 5, 2024

(87) PCT Pub. No.: WO2023/059787
PCT Pub. Date: Apr. 13, 2023

(65) Prior Publication Data
US 2025/0243748 A1    Jul. 31, 2025

Related U.S. Application Data

(60) Provisional application No. 63/253,100, filed on Oct. 6, 2021.

(51) Int. Cl.
*E21B 47/005* (2012.01)
*E21B 41/00* (2006.01)
(Continued)

(52) U.S. Cl.
CPC .......... *E21B 47/005* (2020.05); *E21B 41/005* (2013.01); *E21B 47/002* (2020.05); *E21B 47/07* (2020.05)

(58) Field of Classification Search
CPC .......... G21F 5/008; G21F 5/002; G21F 5/005; G21F 5/012; G21F 5/12; G21F 5/06;
(Continued)

(56) References Cited

U.S. PATENT DOCUMENTS

| 3,379,013 A | 4/1968 | Slagle et al. |
| 3,899,631 A | 8/1975 | Clark |

(Continued)

FOREIGN PATENT DOCUMENTS

| CN | 1973339 | 5/2007 |
| CN | 101124640 | 2/2008 |

(Continued)

OTHER PUBLICATIONS

[No Author Listed], "Yucca Mountain cost estimate rises to $96 billion," World Nuclear News, Aug. 6, 2008, 2 pages.
(Continued)

Primary Examiner — Yanick A Akaragwe
(74) Attorney, Agent, or Firm — Fish & Richardson P.C.

(57) ABSTRACT

A hazardous waste repository includes a directional drillhole formed from a terranean surface into at least one subterranean formation suitable for storing hazardous waste. The directional drillhole includes a storage region configured to store one or more hazardous waste canisters that is configured to enclose hazardous waste. The repository further includes a casing that extends to at or near the terranean surface, through the directional drillhole, and into the storage region of the substantially horizontal drillhole portion. The repository further includes a monitor borehole formed from the terranean surface into the at least one subterranean formation adjacent the storage region. The monitor borehole is sized to receive a measurement instrument run from the terranean surface to a portion of the monitor borehole
(Continued)

adjacent the storage region. The measurement instrument is configured to detect a distortion of the casing.

33 Claims, 5 Drawing Sheets

(51) Int. Cl.
   *E21B 47/002*    (2012.01)
   *E21B 47/07*    (2012.01)
(58) Field of Classification Search
   CPC ..... G21F 9/20; G21F 9/22; G21F 9/24; G21F 9/26; G21F 9/34; G21F 9/36; E21B 41/005
   See application file for complete search history.

(56) References Cited

U.S. PATENT DOCUMENTS

| | | | |
|---|---|---|---|
| 4,708,522 A | 11/1987 | Bergman et al. | |
| 4,886,393 A | 12/1989 | Jahn-Held et al. | |
| 5,133,624 A | 7/1992 | Cahill | |
| 5,165,235 A | 11/1992 | Nitschke | |
| 5,202,522 A | 4/1993 | Williams | |
| 5,318,382 A | 6/1994 | Cahill | |
| 5,340,235 A | 8/1994 | Milliken | |
| 5,377,104 A | 12/1994 | Sorrells et al. | |
| 5,387,741 A | 2/1995 | Shuttle | |
| 5,489,739 A | 2/1996 | Curry et al. | |
| 5,589,603 A | 12/1996 | Alexander et al. | |
| 5,785,133 A | 7/1998 | Murray et al. | |
| 5,850,614 A | 12/1998 | Crichlow | |
| 5,863,283 A | 1/1999 | Gardes | |
| 5,868,210 A | 2/1999 | Johnson et al. | |
| 6,002,063 A | 12/1999 | Bilak et al. | |
| 6,238,138 B1 | 5/2001 | Crichlow | |
| 7,068,748 B2 | 6/2006 | Singh | |
| 7,287,934 B2 | 10/2007 | Okutsu et al. | |
| 8,933,289 B2 | 1/2015 | Crichlow | |
| 9,852,822 B2 | 12/2017 | Singh | |
| 10,002,683 B2 | 6/2018 | Muller et al. | |
| 10,265,743 B1 | 4/2019 | Muller et al. | |
| 10,300,512 B2 | 5/2019 | Muller et al. | |
| 10,315,238 B1 | 6/2019 | Muller et al. | |
| 10,446,287 B2 | 10/2019 | Singh | |
| 10,614,927 B2 * | 4/2020 | Muller | G21F 5/008 |
| 10,861,614 B2 | 12/2020 | Muller et al. | |
| 10,921,301 B2 | 2/2021 | Muller et al. | |
| 10,926,306 B2 | 2/2021 | Muller et al. | |
| 11,131,176 B1 | 9/2021 | Haustveit et al. | |
| 11,135,635 B2 | 10/2021 | Muller et al. | |
| 11,183,313 B2 | 11/2021 | Crichlow | |
| 11,338,337 B2 | 5/2022 | Muller et al. | |
| 2002/0020528 A1 | 2/2002 | McCabe et al. | |
| 2004/0096614 A1 | 5/2004 | Quigley et al. | |
| 2005/0207525 A1 | 9/2005 | Singh | |
| 2008/0039673 A1 | 2/2008 | Maksimov | |
| 2008/0308271 A1 | 12/2008 | Chouzenoux et al. | |
| 2009/0135986 A1 | 5/2009 | Georgii | |
| 2010/0105975 A1 | 4/2010 | Baird | |
| 2010/0234663 A1 | 9/2010 | Crichlow | |
| 2011/0005762 A1 | 1/2011 | Poole | |
| 2011/0054234 A1 | 3/2011 | Georgii | |
| 2014/0221722 A1 | 8/2014 | Germanovich et al. | |
| 2016/0258226 A1 | 9/2016 | Clemens et al. | |
| 2017/0186505 A1 | 6/2017 | Muller et al. | |
| 2018/0144841 A1 | 5/2018 | Singh | |
| 2018/0182504 A1 | 6/2018 | Muller et al. | |
| 2018/0294064 A1 | 10/2018 | Downey | |
| 2018/0345336 A1 | 12/2018 | Muller et al. | |
| 2018/0363411 A1 * | 12/2018 | Al-Mumen | E21B 29/00 |
| 2019/0106986 A1 * | 4/2019 | Kaiser | G05B 15/02 |
| 2019/0318838 A1 | 10/2019 | Muller et al. | |
| 2020/0011169 A1 | 1/2020 | Haghshenas et al. | |
| 2020/0023416 A1 | 1/2020 | Muller et al. | |
| 2020/0027607 A1 * | 1/2020 | Muller | G21F 9/36 |
| 2020/0194140 A1 | 6/2020 | Payer et al. | |
| 2020/0211727 A1 | 7/2020 | Muller et al. | |
| 2020/0271632 A1 | 8/2020 | Muller et al. | |
| 2022/0080481 A1 | 3/2022 | Muller et al. | |

FOREIGN PATENT DOCUMENTS

| | | |
|---|---|---|
| CN | 101971268 | 2/2011 |
| CN | 106782735 | 5/2017 |
| CN | 206514805 | 9/2017 |
| CN | 114486712 | 5/2022 |
| GB | 2104713 | 3/1983 |
| GB | 2151839 | 7/1985 |
| GB | 8512768 | 1/1986 |
| JP | S58-042945 | 3/1983 |
| JP | H07-306299 | 11/1995 |
| JP | 2000231000 | 8/2000 |
| JP | 2003028991 | 1/2003 |
| JP | 2005091070 | 4/2005 |
| JP | 2005245261 | 9/2005 |
| JP | 2006035068 | 2/2006 |
| JP | 2006170690 | 6/2006 |
| JP | 4902877 | 1/2012 |
| TW | I484502 | 5/2015 |
| WO | WO 1981/001055 | 4/1981 |
| WO | WO 1992/007667 | 5/1992 |
| WO | WO 2005/012688 | 2/2005 |
| WO | WO 2010/007305 | 1/2010 |
| WO | WO 2010/101713 | 9/2010 |
| WO | WO 2015/069300 | 5/2015 |
| WO | WO 2016/138389 | 9/2016 |
| WO | WO 2016/177876 | 11/2016 |
| WO | WO 2017/112479 | 6/2017 |

OTHER PUBLICATIONS

Arnold, et al., "Reference Design and Operations of Deep Borehole Disposal of High-Level Radioactive Waste—SAND2011-6749," Sandia National Laboratories, Oct. 2011, 67 pages.

Cornwall, "Deep Sleep. Boreholes drilled into Earth's crust get a fresh look for nuclear waste disposal," Science, Jul. 10, 2015, 349(6244):132-135.

Dozier, "Feasibility of Very Deep Borehole Disposal of US Nuclear Defense Wastes," Thesis for the degree of Master of Science in Nuclear Science and Engineering, Massachusetts Institute of Technology, Sep. 2011, 176 pages.

European Search Report in European Appln No. 22829119.1, mailed on Apr. 22, 2024, 10 pages.

Faybishenko et al., "International Approaches for Deep Geological Disposal of Nuclear Waste: Geological Challenges in Radioactive Waste Isolation, " Lawrence Berkeley National Laboratory and Sandia National Laboratories: prepared for the US Department of Energy, Fifth Worldwide Review, Dec. 2016, 474 pages.

Gibb et al., "A Model for Heat Flow in Deep Borehole Disposals of High-Level Nuclear Waste," Journal of Geophysical Research, May 6, 2008, 113(B5):1-18.

Gibbs, "Feasibility of Lateral Emplacement in Very Deep Borehole Disposal of High Level Nuclear Waste," Thesis for the degrees of Naval Engineering and Nuclear Engineering, Massachusetts Institute of Technology, Jun. 2010, 154 pages.

Hoag, "Canister Design for Deep Borehole Disposal of Nuclear Waste," Thesis for the degree of Master of Science in Nuclear Science and Engineering, Massachusetts Institute of Technology, May 2006, 125 pages.

Hurd, "Choosing and Using a Form Release Agent," Concrete Construction, 1996, 41(10):732-736.

International Preliminary Report on Patentability in International Appl. No. PCT/US2022/034265, mailed Jan. 4, 2024, 6 pages.

International Preliminary Report on Patentability in International Appln. No. PCT/US2020/019225, mailed Sep. 2, 2021, 8 pages.

International Preliminary Report on Patentability in International Appln. No. PCT/US2022/045878, mailed Apr. 18, 2024, 8 pages.

(56) References Cited

OTHER PUBLICATIONS

International Search Report and Written Opinion in International Appln. No. PCT/US2018/035974, mailed Aug. 24, 2018, 13 pages.
International Search Report and Written Opinion in International Appln. No. PCT/US2020/019225, mailed Oct. 27, 2020, 13 pages.
International Search Report and Written Opinion in International Appln. No. PCT/US2022/034265, mailed Nov. 16, 2022, 11 pages.
International Search Report and Written Opinion in International Appln. No. PCT/US2022/045878, mailed Apr. 6, 2023, 12 pages.
International Search Report and Written Opinion in International Appln. No. PCT/US2023/034812, mailed Mar. 1, 2024, 20 pages.
International Search Report and Written Opinion issued in International Application No. PCT/US2016/066539, mailed on Apr. 19, 2017, 13 pages.
Latimes.com [online], "Decades-old war over Yucca Mountain nuclear dump resumes under Trump budget plan," Mar. 29, 2017, retrieved on Dec. 19, 2019, retrieved from URL<https://www.latimes.com/local/california/la-na-yucca-revival-20170329-story.html>, 4 pages.
Neuzil, "Can Shale Safely Host U.S. Nuclear Waste?" EOS, Jul. 23, 2013, 94(30): 1-3.
Office Action in Chinese Appln. No. 2018-80049476, mailed Dec. 11, 2020, 9 pages (with English translation).
Office Action in Japanese Appln. No. 2018-552636, mailed Apr. 27, 2021, 7 pages (with English Translation).
Office Action in Korean Appln. No. 10-2020-7000246, mailed Dec. 14, 2021, 7 pages (with English Translation).
Office Action in Taiwanese Appln. No. 107119231, mailed Dec. 23, 2021, 109 pages (with English Translation).
Sone et al., "Mechanical properties of shale-gas reservoir rocks—Part 1: Static and dynamic elastic properties and anisotropy," Geophysics, Sep.-Oct. 2013, 78(5):D381-392.
Thebulletin.org [online], "Shale: An overlooked option for US nuclear waste disposal," Nov. 2014, retrieved on Aug. 23, 2018, retrieved from URL<http://thebulletin.org/shale-overlooked-option-us-nuclear-waste-disposal7831>, 5 pages.
Thomson, "Performance Confirmation Concepts Study Report," Civilian Radioactive Waste Management System Management & Operating Contractor TRW, Nov. 22, 1996, 331 pages.
U.S. Nuclear Waste Technical Review Board, "A Report to the U.S. Congress and the Secretary of Energy, Evaluation of Technical Issues Associated With the Development of a Separate Repository for U.S. Department of Energy-Managed High-Level Radioactive Waste and Spent Nuclear Fuel," NWTRB, 2015, available at URL: <http://www.nwtrb.gov/reports/disposal_options.pdf>, 30 pages.
United States Department of Energy, "Executive Summary—Environmental Impact Statement, Waste Isolation Pilot Plant (WIPP)," Oct. 1980, 1544 pages.
United States Department of Energy, "Quality Assurance Program Document, DOE/CBFO-94-1012 Revision 13," Carlsbad Field Office, Apr. 20, 2017, 127 pages.
United States Department of Energy, "Safety Evaluation Report Addendum for Annual Update of Waste Isolation Plant, Document Safety Analysis, Revision 6, and Technical Safety Requirements, Revision 6," mailed Feb. 26, 2018, 55 pages.
United States Department of Energy, "Safety Evaluation Report for Approval of DOE/WIPP 07-3372, Waste Isolation Plant Documented Safety Analysis, Revision 5 and DOE/WIPP 07-3373, Waste Isolation Pilot Plant Technical Safety Requirements, Revision 5," mailed Apr. 29, 2016, 235 pages.
United States Department of Energy, "Waste Isolation Pilot Plant, Environmental Monitoring Plan, Revision 10," mailed Jun. 22, 2017, 56 pages.
United States Department of Energy, "Waste Isolation Plant, Documented Safety Analysis," Nuclear Waste Partnership LLC Carlsbad, NM, mailed Feb. 2018, 777 pages.
United States Department of Energy, "Waste Isolation Plant, Final Supplement, Environmental Impact Statement," mailed Jan. 1990, 1498 pages.
United States Department of Energy, "Waste Isolation Plant, Final Technical Safety Requirements," Nuclear Waste Partnership LLC Carlsbad, NM, mailed Feb. 2018, 291 pages.
Winterle et al., "Regulatory Perspectives on Deep Borehole Disposal Concepts," prepared for the U.S. Nuclear Regulatory Commission, Contract NRC-02-07006, Center for Nuclear Waste Regulatory Analyses, San Antonio, TX, May 2011, 24 pages.
YuccaMountain.org [online], "Eureka County, Nevada—Nuclear Waste Office, FAQ," Mar. 17, 2017, retrieved on Dec. 17, 2019, retrieved from URL<https://www.yuccamountain.org/>, 12 pages.
European Search Report in European Appln. No. 22879282.6, mailed on Nov. 18, 2024, 8 pages.

* cited by examiner

MONITORING A HAZARDOUS WASTE REPOSITORY FORMED IN A DRILLHOLE

CROSS-REFERENCE TO RELATED APPLICATIONS

This application is a National Phase Application under 35 U.S.C. § 371 of International Patent Application No. PCT/US2022/045878, filed on Oct. 6, 2022, which claims priority to U.S. Provisional Patent Application Ser. No. 63/253,100, filed on Oct. 6, 2021. The entire contents of all prior applications are incorporated herein by reference.

TECHNICAL FIELD

This disclosure relates to systems and methods for monitoring a hazardous waste repository formed in a drillhole, such as in deep, human-unoccupiable drillholes formed in a subterranean formation.

BACKGROUND

Hazardous waste is often placed in long-term, permanent, or semi-permanent storage so as to prevent health issues among a population living near the stored waste. Such hazardous waste storage is often challenging, for example, in terms of storage location identification and surety of containment. For instance, the safe storage of nuclear waste (e.g., spent nuclear fuel, whether from commercial power reactors, test reactors, or even military waste) is considered to be one of the outstanding challenges of energy technology. Safe storage of the long-lived radioactive waste is a major impediment to the adoption of nuclear power in the United States and around the world. Conventional waste storage methods have emphasized the use of tunnels, and is exemplified by the design of the *Yucca* Mountain storage facility. Other techniques include boreholes, including vertical boreholes, drilled into crystalline basement rock. Other conventional techniques include forming a tunnel with boreholes emanating from the walls of the tunnel in shallow formations to allow human access.

SUMMARY

In an example implementation, a hazardous waste repository includes a directional drillhole formed from a terranean surface into at least one subterranean formation suitable for storing hazardous waste. The directional drillhole includes an access drillhole that includes an entry at the terranean surface and extends substantially vertically toward the one or more subterranean formation, a curved portion coupled to the access drillhole, and a substantially horizontal drillhole portion coupled to the curved portion and extending into the subterranean formation. The substantially horizontal drillhole portion includes a storage region configured to store one or more hazardous waste canisters that is configured to enclose hazardous waste. The repository further includes a casing that extends to at or near the terranean surface, through the directional drillhole, and into the storage region of the substantially horizontal drillhole portion. The repository further includes a monitor borehole formed from the terranean surface into the at least one subterranean formation adjacent the storage region. The monitor borehole is sized to receive a measurement instrument run from the terranean surface to a portion of the monitor borehole adjacent the storage region. The measurement instrument is configured to detect a distortion of the casing.

In an aspect combinable with the example implementation, the measurement instrument includes one or more calipers configured to measure a distortion of the monitor borehole to detect the distortion of the casing.

In another aspect combinable with any of the previous aspects, the measurement instrument includes at least one of a radiation sensor, a temperature sensor, or a salinity sensor.

In another aspect combinable with any of the previous aspects, the measurement instrument includes an acoustic probe configured to record seismic waves scattered off the casing to detect the distortion of the casing.

Another aspect combinable with any of the previous aspects further includes another measurement instrument configured for at least intermittent positioning in the storage region and to detect the distortion of the casing.

In another aspect combinable with any of the previous aspects, the another measurement instrument includes at least one of an optical probe configured to capture one or more images of the storage region or a set of calipers.

In another aspect combinable with any of the previous aspects, the another measurement instrument includes an acoustic probe configured to detect the distortion of the casing.

In another aspect combinable with any of the previous aspects, the acoustic probe includes a fill material positioned in a hollow portion of the acoustic probe and at least one antenna section.

In another aspect combinable with any of the previous aspects, the another measurement instrument includes a graded acoustic fiber configured to detect the distortion of the casing.

Another aspect combinable with any of the previous aspects further includes at least one casing strap positionable on an exterior surface of the casing and configured to detect the distortion of the casing.

In another aspect combinable with any of the previous aspects, the casing strap includes a conductive portion and a non-conductive portion that combine to form a circular member positionable on the exterior surface.

In another aspect combinable with any of the previous aspects, the conductive portion is electrically coupled through one or more wires to the terranean surface.

In another aspect combinable with any of the previous aspects, the non-conductive portion includes a breakable member configured to break based on the distortion of the casing.

In another example implementation, a hazardous waste repository includes a directional drillhole formed from a terranean surface into at least one subterranean formation suitable for storing hazardous waste. The directional drillhole includes an access drillhole that includes an entry at the terranean surface and extends substantially vertically toward the one or more subterranean formation, a curved portion coupled to the access drillhole, and a substantially horizontal drillhole portion coupled to the curved portion and extending into at least one of the one or more subterranean formations. The substantially horizontal drillhole portion includes a storage region configured to store one or more hazardous waste canisters that is configured to enclose hazardous waste. The repository further includes a casing that extends to at or near the terranean surface, through the directional drillhole, and into the storage region of the substantially horizontal drillhole portion. The repository further includes a measurement instrument configured for at least intermittent positioning in the storage region and to detect a distortion of the casing.

In an aspect combinable with the example implementation, the measurement instrument includes at least one of an optical probe configured to capture one or more images of the storage region or a set of calipers.

In another aspect combinable with any of the previous aspects, the measurement instrument includes an acoustic probe configured to detect the distortion of the casing.

In another aspect combinable with any of the previous aspects, the acoustic probe includes a fill material positioned in a hollow portion of the acoustic probe and at least one antenna section.

In another aspect combinable with any of the previous aspects, the measurement instrument includes a graded acoustic fiber configured to detect the distortion of the casing.

Another aspect combinable with any of the previous aspects further includes at least one casing strap positionable on an exterior surface of the casing and configured to detect the distortion of the casing.

In another aspect combinable with any of the previous aspects, the casing strap includes a conductive portion and a non-conductive portion that combine to form a circular member positionable on the exterior surface.

In another aspect combinable with any of the previous aspects, the conductive portion is electrically coupled through one or more wires to the terranean surface.

In another aspect combinable with any of the previous aspects, the non-conductive portion includes a breakable member configured to break based on the distortion of the casing.

Another aspect combinable with any of the previous aspects further includes a monitor borehole formed from the terranean surface into the at least one subterranean formation adjacent the storage region.

In another aspect combinable with any of the previous aspects, the monitor borehole is sized to receive another measurement instrument run from the terranean surface to a portion of the monitor borehole adjacent the storage region, and the another measurement instrument is configured to detect a distortion of the casing.

In another aspect combinable with any of the previous aspects, the another measurement instrument includes one or more calipers configured to measure a distortion of the monitor borehole to detect the distortion of the casing.

In another aspect combinable with any of the previous aspects, the another measurement instrument includes at least one of a radiation sensor, a temperature sensor, or a salinity sensor.

In another aspect combinable with any of the previous aspects, the another measurement instrument includes an acoustic probe configured to record seismic waves scattered off the casing to detect the distortion of the casing.

In another example implementation, a hazardous waste repository includes a directional drillhole formed from a terranean surface into at least one subterranean formation suitable for storing hazardous waste. The directional drillhole includes an access drillhole that includes an entry at the terranean surface and extends substantially vertically toward the one or more subterranean formation, a curved portion coupled to the access drillhole, and a substantially horizontal drillhole portion coupled to the curved portion and extending into at least one of the one or more subterranean formations. The substantially horizontal drillhole portion includes a storage region configured to store one or more hazardous waste canisters that is configured to enclose hazardous waste. The repository further includes a casing that extends to at or near the terranean surface, through the directional drillhole, and into the storage region of the substantially horizontal drillhole portion. The repository further includes at least one casing strap positionable on an exterior surface of the casing and configured to detect a distortion of the casing.

In an aspect combinable with the example implementation, the casing strap includes a conductive portion and a non-conductive portion that combine to form a circular member positionable on the exterior surface.

In another aspect combinable with any of the previous aspects, the conductive portion is electrically coupled through one or more wires to the terranean surface.

In another aspect combinable with any of the previous aspects, the non-conductive portion includes a breakable member configured to break based on the distortion of the casing.

Another aspect combinable with any of the previous aspects further includes a measurement instrument configured for at least intermittent positioning in the storage region and to detect a distortion of the casing.

In another aspect combinable with any of the previous aspects, the measurement instrument includes at least one of an optical probe configured to capture one or more images of the storage region or a set of calipers.

In another aspect combinable with any of the previous aspects, the measurement instrument includes an acoustic probe configured to detect the distortion of the casing.

In another aspect combinable with any of the previous aspects, the acoustic probe includes a fill material positioned in a hollow portion of the acoustic probe and at least one antenna section.

In another aspect combinable with any of the previous aspects, the measurement instrument includes a graded acoustic fiber configured to detect the distortion of the casing.

Another aspect combinable with any of the previous aspects further includes a monitor borehole formed from the terranean surface into the at least one subterranean formation adjacent the storage region.

In another aspect combinable with any of the previous aspects, the monitor borehole is sized to receive another measurement instrument run from the terranean surface to a portion of the monitor borehole adjacent the storage region, and the another measurement instrument is configured to detect a distortion of the casing.

In another aspect combinable with any of the previous aspects, the another measurement instrument includes one or more calipers configured to measure a distortion of the monitor borehole to detect the distortion of the casing.

In another aspect combinable with any of the previous aspects, the another measurement instrument includes at least one of a radiation sensor, a temperature sensor, or a salinity sensor.

In another aspect combinable with any of the previous aspects, the another measurement instrument includes an acoustic probe configured to record seismic waves scattered off the casing to detect the distortion of the casing The details of one or more implementations of the subject matter described in this disclosure are set forth in the accompanying drawings and the description below. Other features, aspects, and advantages of the subject matter will become apparent from the description, the drawings, and the claims.

DETAILED DESCRIPTION

Figure 1:
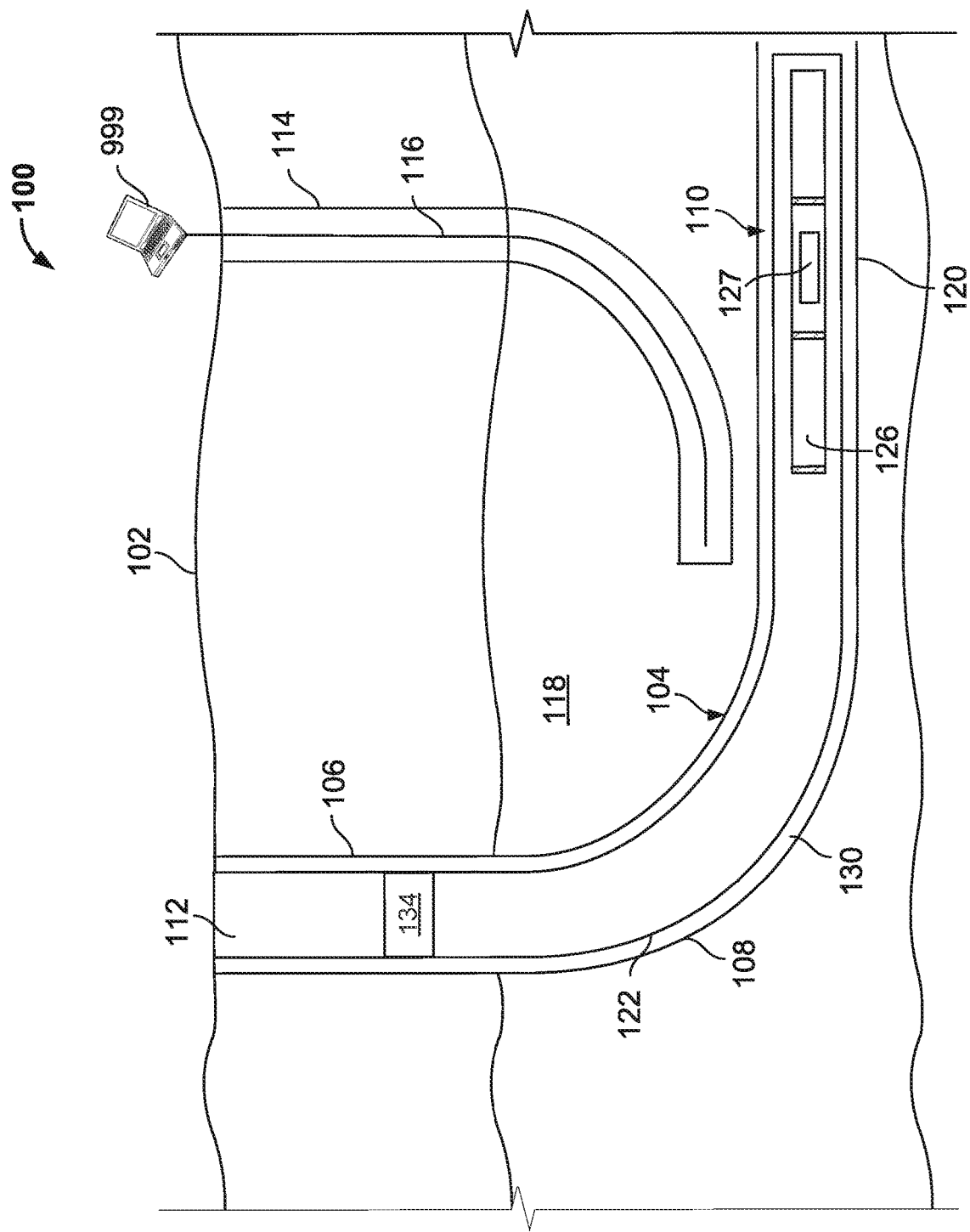
FIG. 1 is a schematic illustration of an example implementation of a hazardous waste repository during monitoring of radioactive or other waste in one or more hazardous waste canisters according to the present disclosure.

Hazardous waste, such as radioactive waste (e.g., spent nuclear fuel, high level waste, transuranic (TRU) waste, and other waste) can be disposed (permanently or for a certain period of time) in one or more canisters in a hazardous waste repository formed in one or more deep, directional drillholes (e.g., also called wellbores or boreholes). Each drillhole is formed from a terranean surface and extends through one or more subterranean formation and lands (e.g., as a horizontal drillhole) in a particular subterranean formation (e.g., shale, salt, crystalline basement rock, or other formation). The drillholes can be drilled as conventional wells, which are unoccupiable by humans (unlike conventional waste repositories that are mined and therefore allow for human occupation in at least a portion thereof).

Such directional drillholes often include horizontal drillhole portions formed at a depth between 1 and 3 km and include a hazardous waste storage portion (or area or region), that is typically near the ends of the respective horizontal drillhole portions (opposite their connections to vertical portions). Such hazardous waste storage portion can also be called disposal regions. These disposal regions can be tens to thousands of meters long. Nuclear waste such as spent nuclear fuel (SNF) and other toxic materials can be placed in the disposal regions (for example, within hazardous waste canisters).

The present disclosure describes methods and systems for monitoring waste stored in directional drillholes in which conditions close to the drillhole (e.g., a few meters) can be monitored in some aspects rather than, for example, conditions within or very close (e.g., inches) to the drillhole. For example, in some aspects, conditions a few meters from the disposal region can be fundamental to human safety, because conditions at that distance can be indicative of movement of the waste out of the repository, or changes in the condition of the rock that can allow such movement to occur in the future. Such measurements can be possibly even more important than are the closer measurements. For example, if radiation increases with time at a distance a few meters from the disposal region, then that can indicate that leakage has occurred. Measurements of temperature in this region can show if the calculations of temperature rise are occurring as expected. Changes in the pH and salinity of the water can indicate flow of water, a potential source of leakage.

The present disclosure further describes example implementations of apparatus, systems, and methods for the monitoring and/or detecting a change of shape of a casing in the drillhole before it becomes sufficiently severe to impede or prevent retrieval. Such monitoring can also provide sufficient warning time that allows the canisters to be removed prior to the absolute impedance or prevention of retrieval. If such warning is available by the disclosed implementations, then that warning provides a risk reduction that could allow less expensive casing or placement in regions where tectonic stresses are uncertain. Thus, such example implementations of apparatus, systems, and methods for monitoring and/or detecting a change of shape of a casing can be used to ensure retrieval of the stored waste is possible for a period of time, such as 100 years, after emplacement.

FIG. 1 is schematic illustrations of example implementations of a hazardous waste repository, e.g., a subterranean location for the long-term (e.g., tens, hundreds, or thousands of years or more) but retrievable safe and secure storage of hazardous material, during a deposit or retrieval operation according to the present disclosure. For example, this figure illustrates an example hazardous waste repository 100 once one or more hazardous waste canisters 126 (that store waste 127, such as chemical, biological, radioactive waste or other waste) have been moved into a drillhole 104 (e.g., wellbore or borehole). As illustrated, the hazardous waste repository 100 includes a drillhole 104 with an entry 112 formed (e.g., drilled or otherwise) from a terranean surface 102 and through multiple subterranean layers. Although the terranean surface 102 is illustrated as a land surface, terranean surface 102 may be a sub-sea or other underwater surface, such as a lake or an ocean floor or other surface under a body of water. Thus, the present disclosure contemplates that the drillhole 104 may be formed under a body of water from a drilling location on or proximate the body of water.

The illustrated drillhole 104 is a directional drillhole in this example of hazardous waste repository 100. For instance, the drillhole 104 includes a substantially vertical portion 106 coupled to a radiussed or curved portion 108, which in turn is coupled to a substantially horizontal portion 110. As used in the present disclosure, "substantially" in the context of a drillhole orientation, refers to drillholes that may not be exactly vertical (e.g., exactly perpendicular to the terranean surface 102) or exactly horizontal (e.g., exactly parallel to the terranean surface 102). In other words, those of ordinary skill in the drill arts would recognize that vertical drillholes often undulate offset from a true vertical direction, that they might be drilled at an angle that deviates from true vertical, and horizontal drillholes often undulate offset from a true horizontal direction. Further, the substantially horizontal portion 110, in some aspects, may be a slant drillhole or other directional drillhole that is oriented between exactly vertical and exactly horizontal. Further, the substantially horizontal portion 110, in some aspects, may be a slant drillhole or other directional well bore that is oriented to follow the slant of the formation. As illustrated in this example, the three portions of the drillhole 104—the vertical portion 106, the radiussed portion 108, and the horizontal portion 110—form a continuous drillhole 104 that extends into the Earth. However, drillhole 104 can be, in other aspects, a vertical drillhole or a slanted or angled drillhole from vertical that is still relatively linear (i.e., with no curved or radiussed or horizontal portion).

The illustrated drillhole 104 can have a surface casing positioned and set around the drillhole 104 from the terranean surface 102 into a particular depth in the Earth. For example, the surface casing may be a relatively large-diameter tubular member (or string of members) set (e.g., cemented) around the drillhole 104 in a shallow formation. As used herein, "tubular" may refer to a member that has a circular cross-section, elliptical cross-section, or other shaped cross-section. For example, in this implementation of the hazardous waste repository 100, the surface casing extends from the terranean surface through a surface layer (one or more subterranean layers at a depth less than subterranean layer 118). The surface layer, in this example, is a geologic layer comprised of one or more layered rock formations. In some aspects, the surface layer in this example may or may not include freshwater aquifers, salt water or brine sources, or other sources of mobile water (e.g., water that moves through a geologic formation). In some aspects, the surface casing may isolate the drillhole 104 from such mobile water, and may also provide a hanging location for other casing strings to be installed in the drillhole 104. Further, although not shown, a conductor casing may be set above the surface casing (e.g., between the surface casing and the surface 102 and within the surface layer) to prevent drilling fluids from escaping into the surface layer.

As illustrated, a production casing 122 is positioned and set within the drillhole 104 downhole of the surface casing. Although termed a "production" casing, in this example, the casing 122 may or may not have been subject to hydrocarbon production operations. Thus, the casing 122 refers to and includes any form of tubular member that is set (e.g., cemented) in the drillhole 104 downhole of the surface casing. In some examples of the hazardous waste repository 100, the production casing 122 may begin at an end of the radiussed portion 108 and extend throughout the substantially horizontal portion 110. The casing 122 can also extend into the radiussed portion 108 and into the vertical portion 106. Generally, casing 122 can represent one or more casing strings, such as a conductor casing, a surface casing, and a production casing, as well as other wellbore tubulars (such as liners).

As shown, cement 130 is positioned (e.g., pumped) around the casing 122 in an annulus between the casing 122 and the drillhole 104. The cement 130, for example, may secure the casing 122 (and any other casings or liners of the drillhole 104) through the subterranean layers under the terranean surface 102. In some aspects, the cement 130 may be installed along the entire length of the casings (e.g., casing 122 and any other casings), or the cement 130 can be used along certain portions of the casings if adequate for a particular drillhole 104. The cement 130 can also provide an additional layer of confinement for the hazardous material in canisters 126.

The drillhole 104 and associated casing 122 may be formed with various example dimensions and at various example depths (e.g., true vertical depth, or TVD). For instance, a conductor casing (not shown) may extend down to about 120 feet TVD, with a diameter of between about 28 in. and 60 in. The surface casing may extend down to about 2500 feet TVD, with a diameter of between about 22 in. and 48 in. An intermediate casing (not shown) between the surface casing and production casing 122 may extend down to about 8000 feet TVD, with a diameter of between about 16 in. and 36 in. The production casing 122 may extend substantially horizontally (e.g., to case the substantially horizontal portion 110) with a diameter of between about 11 in. and 22 in. The foregoing dimensions are merely provided as examples and other dimensions (e.g., diameters, TVDs, lengths) are contemplated by the present disclosure. For example, diameters and TVDs may depend on the particular geological composition of one or more of the multiple subterranean layers (including subterranean formation 118), particular drilling techniques, as well as a size, shape, or design of a hazardous material canister 126 that contains hazardous material to be deposited in the hazardous waste repository 100. In some alternative examples, the production casing 122 (or other casing in the drillhole 104) can be circular in cross-section, elliptical in cross-section, or some other shape.

As illustrated, the drillhole 104 extends through subterranean layers and lands in subterranean layer 118. As discussed above, the surface layer may or may not include mobile water. Another subterranean layer, which is below the surface layer, in this example, can be a mobile water layer. For instance, a mobile water layer may include one or more sources of mobile water, such as freshwater aquifers, salt water or brine, or other source of mobile water. In this example of hazardous waste repository 100, mobile water may be water that moves through a subterranean layer based on a pressure differential across all or a part of the subterranean layer. For example, the mobile water layer may be a permeable geologic formation in which water freely moves (e.g., due to pressure differences or otherwise) within the layer. In some aspects, the mobile water layer may be a primary source of human-consumable water in a particular geographic area. Examples of rock formations of which the mobile water layer may be composed include porous sandstones and limestones, among other formations.

Below the mobile water layer, in this example implementation of hazardous waste repository 100, can be an impermeable layer. The impermeable layer, in this example, may not allow mobile water to pass through. Thus, relative to the mobile water layer, the impermeable layer may have low permeability, e.g., on the order of nanodarcy permeability. Additionally, in this example, the impermeable layer may be a relatively non-ductile (i.e., brittle) geologic formation. One measure of non-ductility is brittleness, which is the ratio of compressive stress to tensile strength. In some examples, the brittleness of the impermeable layer may be between about 20 MPa and 40 MPa.

As shown in this example, the impermeable layer can be shallower (e.g., closer to the terranean surface 102) than the subterranean formation 118 (also called storage layer 118). In this example rock formations of which the impermeable layer may be composed include, for example, certain kinds of sandstone, mudstone, clay, and slate that exhibit permeability and brittleness properties as described above. In alternative examples, the impermeable layer may be deeper (e.g., further from the terranean surface 102) than the storage layer 118. In such alternative examples, the impermeable layer may be composed of an igneous rock, such as granite.

The storage layer 118, in this example, may be chosen as the landing for the substantially horizontal portion 110, which stores the hazardous material, for several reasons. Relative to the impermeable layer or other layers, the storage layer 118 may be thick, e.g., between about 100 and 200 feet of total vertical thickness. Thickness of the storage layer 118 may allow for easier landing and directional drilling, thereby allowing the substantially horizontal portion 110 to be readily emplaced within the storage layer 118 during constructions (e.g., drilling). If formed through an approximate horizontal center of the storage layer 118, the substantially horizontal portion 110 may be surrounded by about 50 to 100 feet of the geologic formation that comprises the storage layer 118. Further, the storage layer 118 may also have no mobile water, e.g., due to a very low permeability of the layer 118 (e.g., on the order of milli- or nanodarcys). In addition, the storage layer 118 may have sufficient ductility, such that a brittleness of the rock formation that comprises the layer 118 is between about 3 MPa and 10 MPa.

Examples of rock formations of which the storage layer 118 may be composed include: shale and anhydrite. Further, in some aspects, hazardous material may be stored below the storage layer, even in a permeable formation such as sandstone or limestone, if the storage layer is of sufficient geologic properties to isolate the permeable layer from the mobile water layer.

In some examples implementations of the hazardous waste repository 100, the storage layer 118 is composed of shale. Shale, in some examples, may have properties that fit within those described above for the storage layer 118. For example, shale formations may be suitable for a long-term confinement of hazardous material (e.g., in the hazardous material canisters 126), and for their isolation from mobile water layer (e.g., aquifers) and the terranean surface 102. Shale formations may be found relatively deep in the Earth, typically 3000 feet or greater, and placed in isolation below any fresh water aquifers.

The hazardous waste canisters 126 can be emplaced through a deposit operation into the horizontal portion 110 of the drillhole 104. For example, a work string (e.g., tubing, coiled tubing, wireline, or otherwise) can be extended into the cased drillhole 104 to place one or more (three shown but there may be more or less) hazardous material canisters 126 into long term, but in some aspects, retrievable, storage in the portion 110. A work string may include a downhole tool that couples to the canister 126, and with each trip into the drillhole 104, the downhole tool may deposit a particular hazardous material canister 126 in the substantially horizontal portion 110.

The downhole tool may couple to the canister 126 by, in some aspects, a threaded connection. In alternative aspects, the downhole tool may couple to the canister 126 with an interlocking latch, such that rotation of the downhole tool may latch to (or unlatch from) the canister 126. In alternative aspects, the downhole tool may include one or more magnets (e.g., rare Earth magnets, electromagnets, a combination thereof, or otherwise) which attractingly couple to the canister 126. In some examples, the canister 126 may also include one or more magnets (e.g., rare Earth magnets, electromagnets, a combination thereof, or otherwise) of an opposite polarity as the magnets on the downhole tool. In some examples, the canister 126 may be made from or include a ferrous or other material attractable to the magnets of the downhole tool.

As another example, each canister 126 may be positioned within the drillhole 104 by a drillhole tractor (e.g., on a wireline or otherwise), which may push or pull the canister into the substantially horizontal portion 110 through motorized (e.g., electric) motion. As yet another example, each canister 126 may include or be mounted to rollers (e.g., wheels), so that the downhole tool may push the canister 126 into the cased drillhole 104.

Each canister 126 may enclose waste or hazardous material 127. Such hazardous material 127, in some examples, may be biological or chemical waste or other biological or chemical hazardous material. In some examples, the hazardous material 127 may include nuclear material, such as spent nuclear fuel recovered from a nuclear reactor (e.g., commercial power or test reactor) or military nuclear material. For example, a gigawatt nuclear plant may produce 30 tons of spent nuclear fuel per year. The density of that fuel is typically close to 10 (10 gm/cm$^3$=10 kg/liter), so that the volume for a year of nuclear waste is about 3 m$^3$. Spent nuclear fuel, in the form of nuclear fuel pellets, may be taken from the reactor and not modified. Nuclear fuel pellets are solid, and emit very little gas other than short-lived tritium (13 year half-life).

Each hazardous waste canister 126, as explained more fully within, can enclose multiple, different forms of radioactive waste for storage or disposal. For example, nuclear waste comes in many forms. The most dangerous waste is high-level or highly radioactive waste. There are many examples of nuclear waste forms, including:

(1) Cesium-137 and Strontium-90, currently in temporary storage at the U.S. Hanford Laboratory. This form of nuclear waste consists of capsules that are 9 cm (3.5 inches) in diameter and 60 cm (24 inches) long.

(2) Spent nuclear fuel from commercial nuclear reactors. This form of nuclear waste consists of 1-cm size pellets held in "fuel assemblies" that are rod shaped and typically 20 to 30 cm in diameter and 4 m long.

(3) Vitrified waste. This form of nuclear waste is nuclear fuel that may have been reprocessed but is currently encased in glass. The glass serves as an "engineered barrier" to absorb short-range nuclear radiation (e.g., alpha and beta particles) and to partially contain radionuclides that can diffuse out from the nuclear fuel. The cylinders of glass are typically 30 to 45 cm in diameter and 3 meters long.

(4) Fragments of melted core from nuclear accidents. This form of nuclear waste generally does not have a standardized shape or size.

(5) Calcine waste. This form of nuclear waste is formerly liquid but has been converted to a granular solid in no standardized shape or size.

(6) Fourth generation nuclear reactor waste (including, for example, advanced reactor waste). This form of nuclear waste can come in many types. One example type includes the fuel for "pebble bed" nuclear reactors that consists of 6.7 cm (2.6 inches) diameter pellets (e.g., about the size of tennis balls). If this fuel is reprocessed (and some of it is intended for that), then the final format of the fuel may not be determined.

(7) Transuranic (or TRU) waste. This form of nuclear waste is currently disposed at the Waste Isolation Pilot Plant in New Mexico within 15 or 30 gallon drums (with diameters between 14 and 19 inches).

This list of nuclear waste forms between (1)-(7) is not meant to be comprehensive; for example, there are many forms of medical waste, research waste, and defense waste. But the variety that this list exhibits illustrates the challenge of disposing of the radioactive waste in a universal manner.

In some aspects, the storage layer 118 should be able to contain any radioactive output (e.g., including gases) within the layer 118, even if such output escapes the canisters 126. For example, the storage layer 118 may be selected based on diffusion times of radioactive output through the layer 118. For example, a minimum diffusion time of radioactive output escaping the storage layer 118 may be set at, for example, fifty times a half-life for any particular component of the nuclear fuel pellets. Fifty half-lives as a minimum diffusion time would reduce an amount of radioactive output by a factor of $1 \times 10^{-15}$ As another example, setting a minimum diffusion time to thirty half-lives would reduce an amount of radioactive output by a factor of one billion.

For example, plutonium-239 is often considered a dangerous waste product in spent nuclear fuel because of its long half-life of 24,100 years. For this isotope, 50 half-lives would be 1.2 million years. Plutonium-239 has low solubility in water, is not volatile, and as a solid is not capable of diffusion through a matrix of the rock formation that comprises the illustrated storage layer 118 (e.g., shale or other formation). The storage layer 118, for example comprised of shale, may offer the capability to have such isolation times (e.g., millions of years) as shown by the geological history of containing gaseous hydrocarbons (e.g., methane and otherwise) for several million years. In contrast, in conventional nuclear material storage methods, there was a danger that some plutonium might dissolve in a layer that comprised mobile ground water upon confinement escape.

In some aspects, the drillhole 104 may be formed for the primary purpose of long-term storage of hazardous materials. In alternative aspects, the drillhole 104 may have been previously formed for the primary purpose of hydrocarbon production (e.g., oil, gas). For example, storage layer 118 may be a hydrocarbon bearing formation from which hydrocarbons were produced into the drillhole 104 and to the terranean surface 102. In some aspects, the storage layer 118 may have been hydraulically fractured prior to hydrocarbon production. Further in some aspects, the production casing 122 may have been perforated prior to hydraulic fracturing. In such aspects, the production casing 122 may be patched (e.g., cemented) to repair any holes made from the perforating process prior to a deposit operation of hazardous material. In addition, any cracks or openings in the cement between the casing and the drill hole can also be filled at that time.

For example, in the case of spent nuclear fuel as a hazardous material, the drillhole 104 may be formed at a particular location, e.g., near a nuclear power plant, as a new drillhole provided that the location also includes an appropriate storage layer 118, such as a shale formation. Alternatively, an existing well that has already produced shale gas, or one that was abandoned as "dry," (e.g., with sufficiently low organics that the gas in place is too low for commercial development), may be selected as the drillhole 104. In some aspects, prior hydraulic fracturing of the storage layer 118 through the drillhole 104 may make little difference in the hazardous material storage capability of the drillhole 104. But such a prior activity may also confirm the ability of the storage layer 118 to store gases and other fluids for millions of years. If, therefore, the hazardous material or output of the hazardous material (e.g., radioactive gasses or otherwise) were to escape from the canister 126 and enter the fractured formation of the storage layer 118, such fractures may allow that material to spread relatively rapidly over a distance comparable in size to that of the fractures. In some aspects, the drillhole 104 may have been drilled for a production of hydrocarbons, but production of such hydrocarbons had failed, e.g., because the storage layer 118 comprised a rock formation (e.g., shale or otherwise) that was too ductile and difficult to fracture for production, but was advantageously ductile for the long-term storage of hazardous material.

As shown, FIG. 1 illustrates the hazardous waste repository 100 in a long term storage and monitoring. One or more hazardous material canisters 126 are positioned in the substantially horizontal portion 110 of the drillhole 104. A seal 134 is placed in the drillhole 104 between the location of the canisters 126 in the substantially horizontal portion 110 and an opening of the substantially vertical portion 106 at the terranean surface 102 (e.g., a well head). In this example, the seal 134 is placed at an uphole end of the substantially vertical portion 108. Alternatively, the seal 134 may be positioned at another location within the substantially vertical portion 106, in the radiussed portion 108, or even within the substantially horizontal portion 110 uphole of the canisters 126. In some aspects, the seal 134 may be placed at least deeper than any source of mobile water, such as the mobile water layer, within the drillhole 104. In some aspects, the seal 134 may be formed substantially along an entire length of the substantially vertical portion 106.

As illustrated, the seal 134 fluidly isolates the volume of the substantially horizontal portion 110 that stores the canisters 126 from the opening of the substantially vertical portion 106 at the terranean surface 102. Thus, any hazardous material (e.g., radioactive material) that does escape the canisters 126 may be sealed (e.g., such that liquid, gas, or solid hazardous material) does not escape the drillhole 104. The seal 134, in some aspects, may be a cement plug or other plug, that is positioned or formed in the drillhole 104. As another example, the seal 134 may be formed from one or more inflatable or otherwise expandable packers positioned in the drillhole 104.

Prior to a retrieval operation, the seal 134 may be removed. For example, in the case of a cement or other permanently set seal 134, the seal 134 may be drilled through or otherwise milled away. In the case of semi-permanent or removable seals, such as packers, the seal 134 may be removed from the drillhole 104 through a conventional process as is known.

Referring generally to FIG. 1, the example hazardous waste repository 100 may provide for multiple layers of containment to ensure that a hazardous material (e.g., biological, chemical, nuclear) is sealingly stored in an appropriate subterranean layer. In some example implementations, there may be at least twelve layers of containment. In alternative implementations, a fewer or a greater number of containment layers may be employed. First, using spent nuclear fuel as an example hazardous material, the fuel pellets are taken from the reactor and not modified. They may be made from sintered uranium dioxide ($UO_2$), a ceramic, and may remain solid and emit very little gas other than short-lived tritium. Unless the pellets are exposed to extremely corrosive conditions or other effects that damage the multiple layers of containment, most of the radioisotopes (including the tritium) will be contained in the pellets. Second, the fuel pellets are surrounded by the zircaloy tubes of the fuel rods, just as in the reactor. As described, the tubes can be mounted in the original fuel assemblies, or removed from those assemblies for tighter packing. Third, the tubes are placed in the sealed housings of the hazardous material canister. The housing may be a unified structure or multi-panel structure, with the multiple panels (e.g., sides, top, bottom) mechanically fastened (e.g., screws, rivets, welds, and otherwise). Fourth, a material (e.g., solid or fluid) may fill the hazardous material canister to provide a further buffer between the material and the exterior of the canister. Fifth, the hazardous material canister(s) are positioned (as described above), in a drillhole that is lined with a steel or other sealing casing that extends, in some examples, throughout the entire drillhole (e.g., a substantially vertical portion, a radiussed portion, and a substantially horizontal portion). The casing is cemented in place, providing a relatively smooth surface (e.g., as compared to the drillhole wall) for the hazardous material canister to be moved through, thereby reducing the possibility of a leak or break during deposit or retrieval. Sixth, the cement that holds or helps hold the casing in place, may also provide a sealing layer to contain the hazardous material should it escape the canister. Seventh, the hazardous material canister is stored in a portion of the drillhole (e.g., the substantially horizontal portion) that is positioned within a thick (e.g., 100-200 feet) seam of a rock formation that comprises a storage layer. The storage layer may be chosen due at least in part to the geologic properties of the rock formation (e.g., no mobile water, low permeability, thick, appropriate ductility or non-brittleness).

For example, in the case of shale as the rock formation of the storage layer, this type of rock may offers a level of containment since it is known that shale has been a seal for hydrocarbon gas for millions of years. The shale may contain brine, but that brine is demonstrably immobile, and not in communication with surface fresh water. Eighth, in some aspects, the rock formation of the storage layer may have other unique geological properties that offer another level of containment. For example, shale rock often contains reactive components, such as iron sulfide, that reduce the likelihood that hazardous materials (e.g., spent nuclear fuel and its radioactive output) can migrate through the storage layer without reacting in ways that reduce the diffusion rate of such output even further. Further, the storage layer may include components, such as clay and organic matter, that typically have extremely low diffusivity. For example, shale may be stratified and composed of thinly alternating layers of clays and other minerals. Such a stratification of a rock formation in the storage layer, such as shale, may offer this additional layer of containment. Ninth, the storage layer may be located deeper than, and under, an impermeable layer, which separates the storage layer (e.g., vertically) from a mobile water layer. Tenth, the storage layer may be selected based on a depth (e.g., 3000 to 12,000 ft.) of such a layer within the subterranean layers. Such depths are typically far below any layers that contain mobile water, and thus, the sheer depth of the storage layer provides an additional layer of containment. Eleventh, example implementations of the hazardous waste repository of the present disclosure facilitate monitoring of the stored hazardous material. For example, if monitored data indicates a leak or otherwise of the hazardous material (e.g., change in temperature, radioactivity, or otherwise), or even tampering or intrusion of the canister, the hazardous material canister may be retrieved for repair or inspection. Twelfth, the one or more hazardous material canisters may be retrievable for periodic inspection, conditioning, or repair, as necessary (e.g., with or without monitoring). Thus, any problem with the canisters may be addressed without allowing hazardous material to leak or escape from the canisters unabated.

In some aspects, an ability to retrieve the stored hazardous waste (e.g., if a community decides that there is value in doing so) from the example hazardous waste repository 100 may be desirable. For example, an ability to retrieve stored waste in a drillhole can be advantageous and possibly required for between months, decades, to 100 years from the first placement of waste (or more). When hazardous waste is stored in a deep, human-unoccupiable drillhole, there can be at least two, known impediments to such retrieval. The first can be corrosion from, e.g., a casing (installed and, at times, cemented in the drillhole) and the one or more hazardous waste canisters that enclose the waste (and are often made of a metallic material). Another impediment can be a gradual deforming of the casing (and drillhole) by tectonic forces in the subterranean formation(s) into and through which the drillhole is formed. For example, as the casing is squeezed by such tectonic forces (or other subterranean formation pressure), its shape can be distorted, typically from circular to elliptical, in such a way as to prevent or impede extraction of the canisters back to the terranean surface.

In some aspects, the access drillhole portion 106 is easily monitored (relative to the horizontal drillhole portion and storage region), perhaps every few months or every few years, by lowering a standard set of calipers into the vertical drillhole. If, for example, a few percent distortion is detected, then the waste 127 (in canisters 126) can be removed before the distortion grows too large to allow doing so. However, such ease of monitoring may not extend to the storage region that is at least partially filled with hazardous waste canisters 126.

The implementations described in the present disclosure can facilitate monitoring of the storage region and, further, operate in a high radiation environment that exists if the hazardous waste material 127 is comprised on nuclear waste (e.g., spent nuclear fuel or otherwise). Instruments and detectors that can be damaged and made non-functioning by intense gamma radiation are not included in the example implementations except in aspects in which such instruments can be inserted and removed quickly in less time than it takes for radiation damage to render them inoperable.

Figure 2:
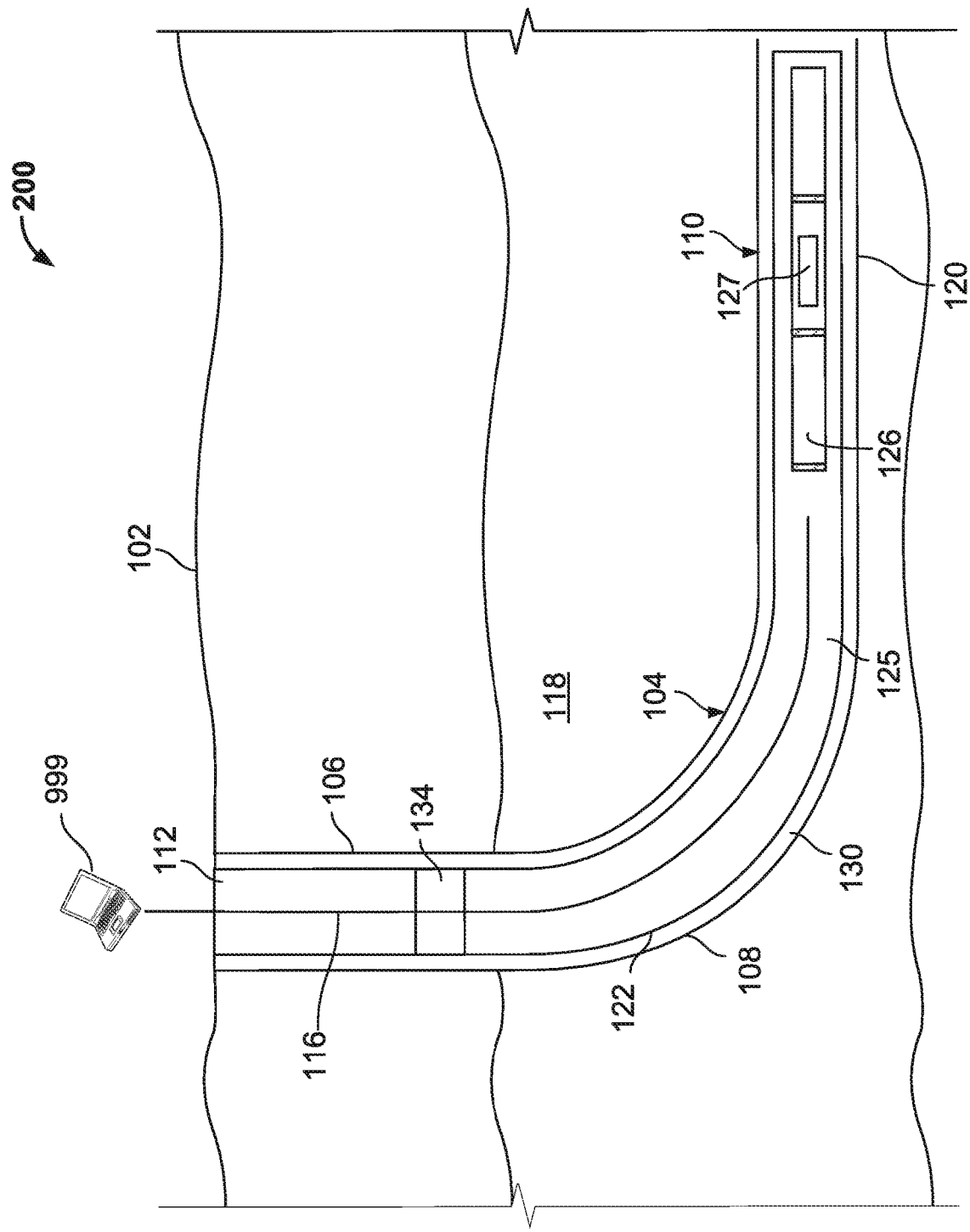
FIG. 2 is a schematic illustration of another example implementation of a hazardous waste repository during monitoring of radioactive or other waste in one or more hazardous waste canisters according to the present disclosure.

In some aspects, the example implementations provide early warning of distortion of the casing 122 and/or drillhole in the hazardous waste repository 100 (and 200 as shown in FIG. 2). If the distortion is rapid, then a warning may not suffice. However, in many geologic formations, the distortions of concern take place gradually (e.g., over years or decades) so early detection allows retrieval of the waste before it becomes impractical.

In example repositories according to the present disclosure in which the disposed hazardous waste 127 is not radioactive, then the described implementations can be used with a wider range of probes (e.g., probes that otherwise would be rendered inoperable by radiation). These probes include integrated circuit devices and fiber optics transmission of signals.

In an example implementation such as shown in FIG. 1, a monitor borehole 114 can be formed from the terranean surface 102 to at or near the storage region 120 of the horizontal drillhole portion 110 (and can be substantially vertical, slant, or directional as shown, and can be one or multiple monitor boreholes). For example, a relatively small-diameter (and therefore inexpensive) directional borehole 114 can be drilled to be roughly parallel to the storage region 120 (as shown). In some aspects, the monitor borehole 114 can be adjacent the storage region 120 or further away, such as between 10-100 meters or more. In some aspects, the monitor borehole 114 can be located so as to land or reside in a region of the subterranean formation 118 (or other layer) that is expected to have tectonics (that is, internal stresses and relative motions) similar to that of the formation in which the storage region 120 is located.

If tectonic motion moves part of the storage region 120 of the drillhole 104 with respect to another part, thereby shearing it, the monitor borehole 114 can be close enough that it too will be sheared. Similarly, if the stresses in the rock of storage layer 118 are sufficient to gradually change the shape of the storage region 120 of the drillhole 104, the monitor borehole 114 can be close enough that it, too, can be distorted. But as the monitor borehole 114 is exclusive of hazardous waste canisters, calipers (e.g., the measurement instrument 116 as shown in some aspects) can be periodically lowered and moved along its entire length of the monitor borehole 114 to detect such shear or distortion while the storage region 120 is still sufficiently open to allow retrieval of the waste canisters 126. If distortion is detected, then the waste 127 can be retrieved to the terranean surface 102 and placed elsewhere.

In some aspects, the monitor borehole 114 can serve other purposes, such as providing a location for other (or additional) instruments measuring, e.g., radiation, temperature, salinity (or any combination thereof). In some aspects, one such monitor borehole 114 could provide distortion monitoring for a set of storage regions as long as the storage regions are sufficiently within or close to the subterranean formation 118 of the monitoring borehole 114 (and possibly oriented in the same direction as the monitor borehole 114).

In another example implementation, a measurement instrument 116 of FIG. 1 can measure acoustic energy. For example, assuming a typical P-wave velocity of 6 km per second, for a 1-meter wavelength the frequency required is 6 Hz. Such acoustic signals can scatter off the outer diameter of the casing from different directions, e.g., from two sets of 2D surface acoustic imaging arrays, or from a single 2D imaging array that is moved, or by a 3D imaging array. As a record of such signals is collected over time, the detection of changes to the casing 122 in the storage region 120 can become even more sensitive than a direct measurement of the casing 122 or borehole shape, and could allow the use of lower frequencies. In the presence of a monitor borehole 114 as shown, hole-to-hole acoustic imaging can be used to generate a more detailed record of the drillhole 104 shape in the storage region 120.

In another example implementation, a measurement instrument 116, such as a distortion probe, can be positioned within the directional drillhole as shown in FIG. 2 for hazardous waste repository 200 (with other components of the repository 200 similar to those previously described with respect to the hazardous waste repository 100). For example, the outer diameter (OD) of a waste canister 126 is made only slightly smaller than the inner diameter (ID) of the casing 122. This can be done to save cost of drilling and casing. However, if storage region shape distortion is a concern, then the ID of the casing 122 can be increased to allow a measurement instrument 116, such as an inspection probe, to move along the storage region 120 within the horizontal drillhole portion 106 as shown. In an example implementation, a fluid 125 filling the space between the canisters 126 and casing 122 can be clear brine, and an optical camera with steering mechanism (e.g., as part of or as the measurement instrument 116) can be moved along the storage region 120 to give a visual image of distortion of casing 122 before it becomes sufficient to impede retrieval. Such probe can also include a caliper to measure the spacing between the canisters 126 and the casing 122. The probe can have a caliper that would open in the storage region between canisters to measure the ID of the casing. The caliper can be mechanical or acoustic. The measurement instrument 116 can contain a combination of such probes.

In some aspects, the distortion probe (measurement instrument 116) can be intermittently placed in the storage region 120, e.g., initially once per month, but later once per year, and each time for a duration of only a few hours. Thus, such a probe would not have to have a life expectancy greater than the time it takes to survey the storage region 120 of the drillhole. That feature can be advantageous if the waste is highly radioactive, since gamma rays over an extended period of time can damage electronic sensors and fiber optics.

In some aspects, the measurement instrument 116 of FIG. 2 can be or include a guide tube that is placed either prior to its first deployment, or at the same time. A guide tube is a hollow tube with sufficient inner diameter to hold a distortion probe (with the guide tube and distortion probe combining to form the measurement instrument 116 in this example). The guide tube can include a series of openings, none large enough for the distortion probe to exit, but sufficiently large that the distortion probe could operate. In example implementations, the guide tube has openings that are less than 180° around the circumference of the tube and long enough to allow a camera to have an unobscured view, or to allow a caliper to open. The placement of the guide tube can allow the insertion of the measurement probe to be done quickly. In addition, that the guide tube position changes little over time facilitates change determination. In some aspects, the guide tube can include expanding legs that help hold it in a constant configuration over years or longer.

In another example implementation, the measuring instrument 116 of FIG. 2 can be or include an acoustic probe that can convey a ping or other acoustic signal to one or more points inside or outside the casing. In an example implementation, the acoustic probe (as measurement instrument 116) is comprised of a hollow metal tube with sound that travels along the interior volume of the metal tube. The sound can be a short ping or a more extended pulse. In some aspects, the tube can contain a "fill" in its interior volume (e.g., brine or other fluid, or a metal or other solid). If the velocity of sound in the tube material is significantly higher than that of the fill, then sound in the brine will be reflected from the metal, in analogy to total internal reflection in optics, thus reducing loss of sound energy from the tube.

Along the length of the acoustic probe tube, certain regions can be modified to cause a partial reflection and partial escape of part of the acoustic signal into the casing. These regions are called antenna sections. One example of such an antenna would be a wedge of material that reflects a portion of the sound at an angle of roughly 45°. When an acoustic pulse reaches the antenna section, part of the energy of that pulse is also reflected back up the acoustic probe tube, and part leaves the probe and enters the casing. Some of that energy will enter into the interior of the casing and reflect off the opposite interior casing surface. Some of that reflected pulse will return to the antenna, and some of that will travel up the acoustic probe tube. At the terranean surface, both the return ping (from the antenna) and the casing reflected ping are detected. The time that the return ping arrives allows identification of the location of the particular antenna that caused it; the time between the return ping and the reflected ping gives a measure of the diameter of the interior surface of the casing or of the spacing between the casing and the canister, depending on whether the antenna was close to a canister or not.

Figure 3:
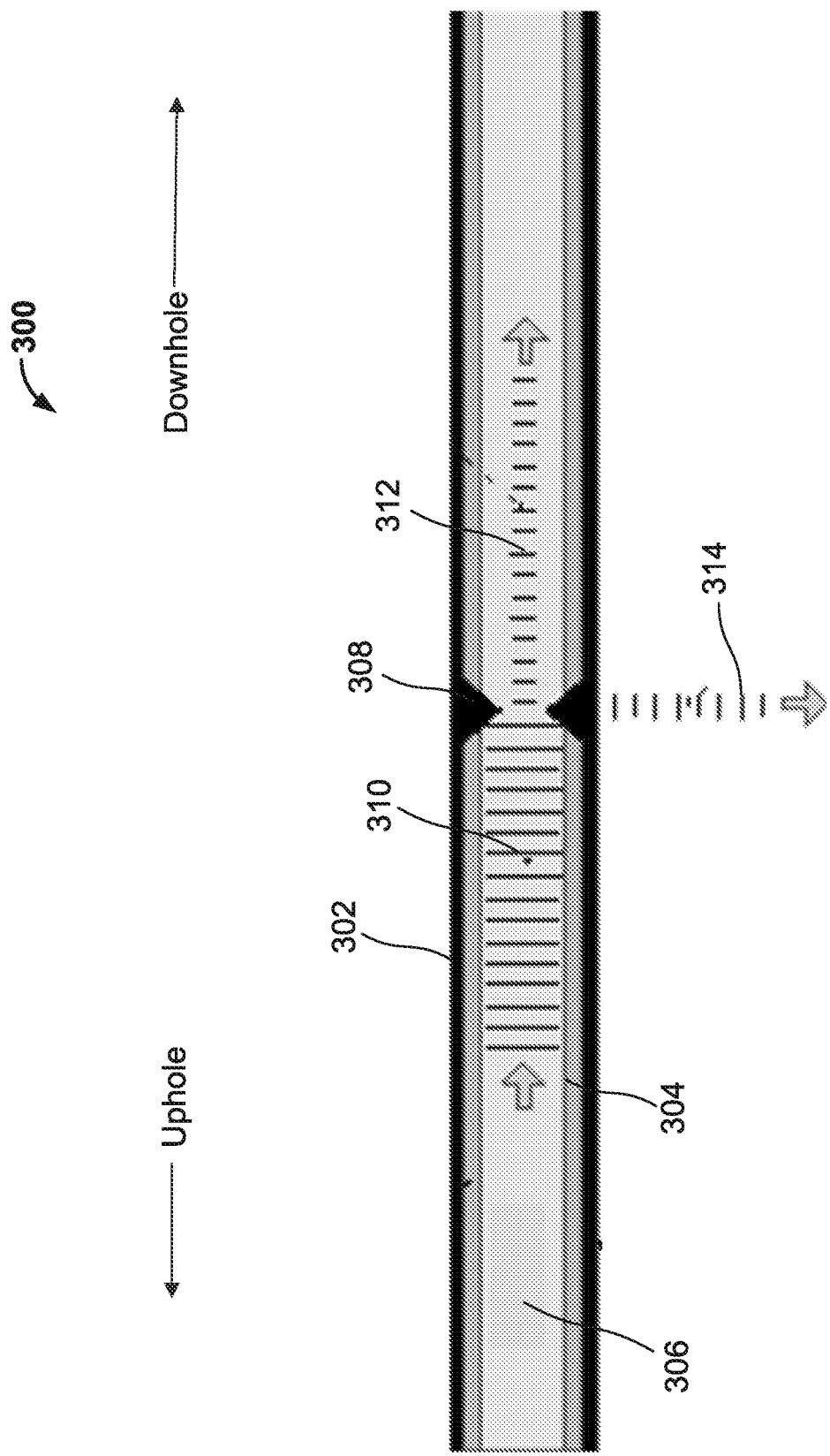
FIG. 3 is a schematic illustration of an example acoustic probe according to the present disclosure.

FIG. 3 illustrates a schematic diagram of an example acoustic probe 300 according to the present disclosure. In this figure, there are two layers to the acoustic probe 300: an outer layer 302 with a fastest sound speed and an intermediate layer 304 with a sound speed faster than that of a fill 306, but slower than that of the outer layer 302. This configuration can reduce the energy of the sound that escapes out of the sides of the probe tube (as part of the probe 300). The incident sound waves 310 in the fill 306 are depicted by a series of short lines representing peaks of sound wave intensity. Some of this sound is reflected by the wedge of the antenna 308 (i.e., the reflector), and exits the tube of the probe 300. Only the downhole-directed exiting wave 312 is shown in the diagram. Some of the incident sound 310 is transmitted through the middle opening of the antenna 308, and continues to travel along the tube as waves 312. This incident sound 312 can eventually reach additional antenna sections of the acoustic probe 300. The antenna 308 can also receive the wave 314 reflected from the interior surface of the casing 122, and reflect it back (uphole) to the terranean surface 102 of the repository. Diffractive spreading of the transmitted and reflected sound is not shown. Also not shown is the sound reflected from the casing. Only one design of an antenna is shown; many other known configurations are contemplated by the present disclosure.

In another example implementation, the measuring instrument 116 of FIG. 2 can be or include a graded acoustic fiber.

As described with the acoustic probe, a tube made of a material with a high acoustic velocity, surrounding a fill with lower acoustic velocity, behaves for acoustics in a way analogous to the way an optical fiber behaves for light, reducing losses along the length because of total internal reflection at the interface. In a similar way, a graded acoustic fiber is analogous to a graded optical fiber. A graded acoustic fiber is comprised of material that can carry sound but has an acoustic velocity that is an increasing function of radius from the axis of the tube to the outer surface. By choosing this velocity profile in a manner similar to that used in optical fibers, sound will not only be transferred down the tube, but it will be repeatedly focused onto the axis. The sound will not reach the outer surface of the fiber; thus losses will be significantly suppressed. Such a graded acoustic fiber can have a continuously changing velocity as a function of radius, or it could consist of a series of different velocities obtained by having concentric tubes of different materials. For monitoring the casing 122, the graded acoustic fiber can also have antenna sections located along its length, and can be used in an identical or similar manner to the acoustic probe.

Such instruments that are referenced as being used as the measurement instrument 116 in FIG. 2 can also be used as the measurement instrument 116 in FIG. 1 in the monitor borehole 114. Further, as shown in FIGS. 1 and 2, a control system 999 can be communicably coupled to the measurement instrument 116 to receive and process data gathered by the measurement instrument 116 (in real time while the measurement instrument 116 is the drillhole 104 and/or the monitor borehole 114) and/or subsequent to retrieval of the measurement instrument 116 to the terranean surface.

For example, measurements (acoustic, diameter or other distance in the monitor drillhole, radiation, salinity, temperature) taken by the measurement instrument 116 can be provided to or recorded by the control system 999. Such measurements can be an indication of, e.g., distortion in the casing 122 (due to age, tectonic activity, or otherwise). As an example, in the case of the measurement instrument 116 measuring a diameter of the monitor borehole 114, the instrument 116 may measure a diameter (e.g., with calipers) that is less than a threshold distance, thereby indicating collapse or distortion of the borehole 114 (e.g., due to tectonic activity). Such an indication of the monitor borehole 114 (by measurements of the instrument 116 within the borehole 114 and provided to the control system 999) can indicate and/or be a proxy to an indication that the casing 122 (e.g., in storage region 120) has also been distorted or collapsed. The control system 999 can then provide an indication or alarm or alert indicating the possible distortion of the casing 122 (and, in some aspects, a recommendation to retrieve one or more waste canisters 126 from the storage region 120). Other measurements taken by the measurement instrument 116 can also provide such an indication of the distortion or collapse of the casing 122.

Figure 4:
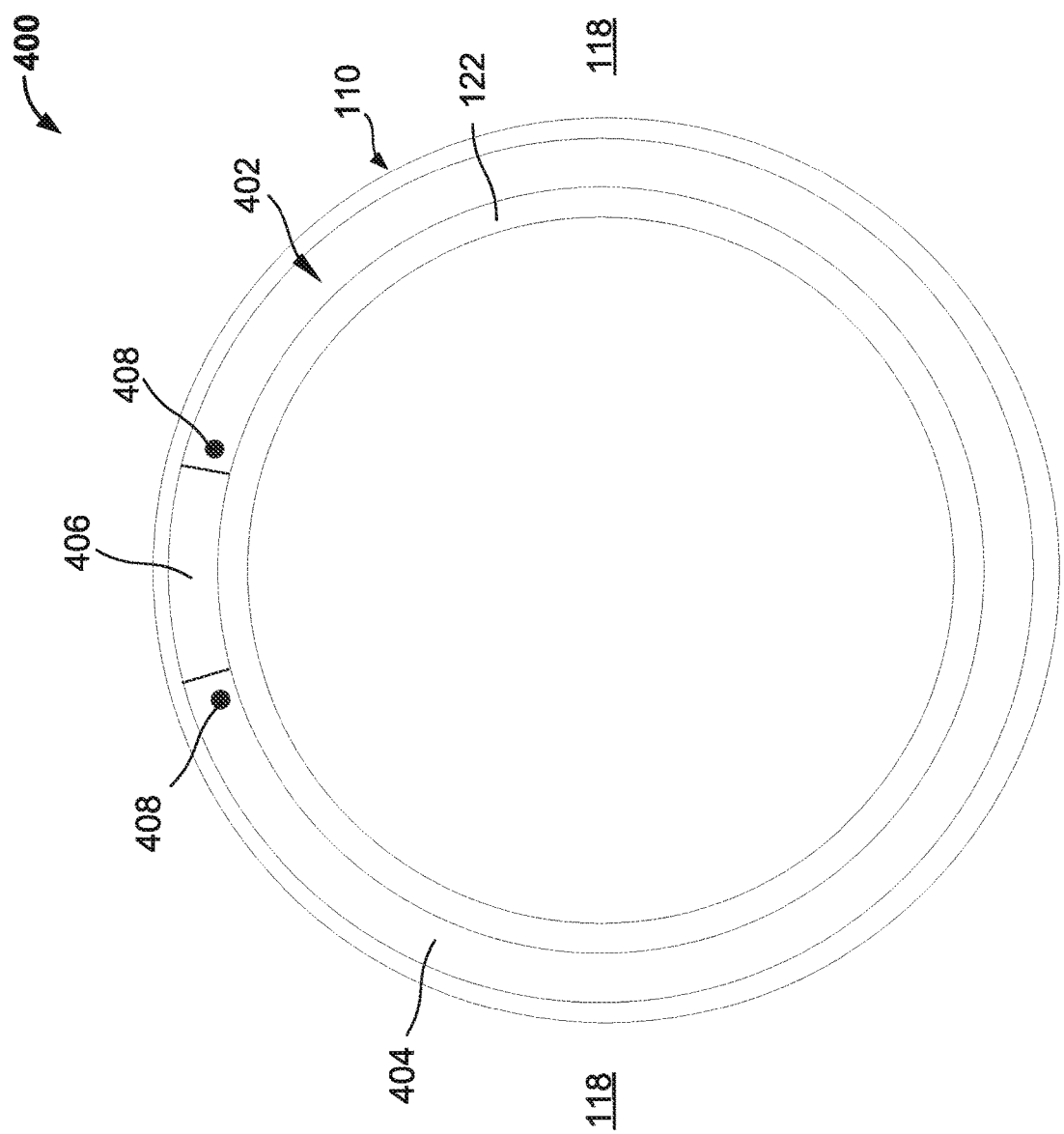
FIG. 4 is a schematic illustration of a radial cross section taken of a horizontal drillhole portion of a hazardous waste repository that includes a casing strap according to the present disclosure.

In another example implementation, a casing strap can be used to detect distortion of the casing caused by seismic or tectonic activity. For example, the casing 122 shown in FIG. 1 or 2 can include one or more casing straps that are positioned around an external surface of the casing prior to installation. FIG. 4 shows a radial cross section 400 taken of the casing 122 in the horizontal drillhole portion 106 of FIG. 1, including a casing strap 402. In some aspects, the casing strap 402 is a flexible or rigid circular member placed around the outside of the casing 122 that will break if the casing 122 distorts by more than a few percent. The breaking of the strap 402 is an indication that distortion of the casing 122 may be taking place, and can be used to trigger confirmatory measures (such as active seismic) or to indicate that the waste 127 in the canisters 126 should be retrieved before the distortion increases further. The casing strap 402 can be placed on the outer surface of a casing section after it is attached to the casing string and before it is run into the directional drillhole 104. In some aspects, a separate casing strap 402 can be positioned on each 40-foot long casing section. Although not shown, the cement 130 can also be used with the casing strap 402.

In some aspects, breaking of the casing strap 402 can be conveyed to the terranean surface 102 in several different ways. For example, as shown in FIG. 4, the casing strap 402 wraps around all 360° of the exterior circumference of the casing 122. In this example, less than 360° (e.g., 350° or other amount) of the strap 402 is made from a conductive material 404, such as zinc, manganese, beryllium, or chromium. In this example, the remaining portion of the strap 402 (e.g., the 10° or otherwise) is an insulative or non-conductive material 406 (which can be brittle), such as a ceramic. Insulated wires 408 can be attached to the two ends of the conductive material 404 portion of the strap 402, with the far end of these wires extending to the surface 102 (and, in some aspects, attached to the casing 122 along the way). In some aspects, the wires 408 can be communicably coupled to the control system 999. The wires 408 together with the conductive portion 404 of the strap 402 form a complete circuit that can carry electric current. If the strap 402 breaks, then that will be detectable at the surface 102 (e.g., at control system 999) as a sudden increase in the resistance of the circuit formed by the wires 408 and the conductive portion 404.

In some aspects, the electrical connection to the surface 102 can include or use a wired casing (similar to a wired drillpipe) in which electrical wires in different segments are connected when sections of the casing 122 are connected. It is not necessary to use direct current to detect the strap break; alternating current (AC) could also be used, and use of AC allows inductive coupling to connect wires 408 on different casing sections rather than direct electric connection.

In an alternate implementation, the breaking of the strap 402 (by breaking the non-conductive material 406) could be detected acoustically, such as by seismic monitors on the surface 102 or by monitors on the casing 122 or by an acoustic fiber to the surface 102 as a measurement instrument 116 (as described earlier). For example, a brittle material such as ceramic that is used for the non-conductive material 406 will make a detectable acoustic response upon breaking that is caused by distortion of the casing 122 (e.g., by tectonic activity or otherwise).

Figure 5:
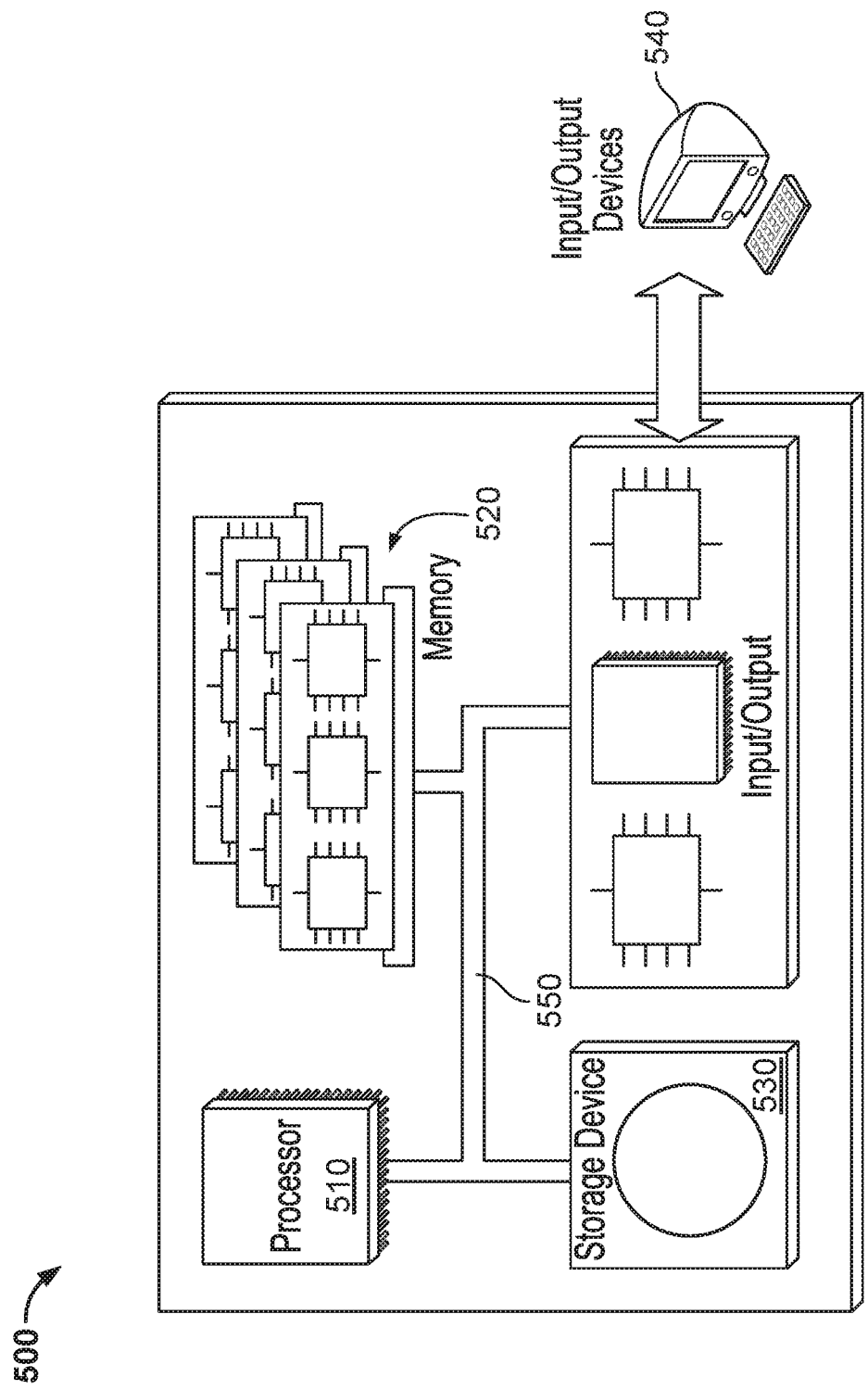
FIG. 5 is a schematic illustration of a controller or control system according to the present disclosure.

FIG. 5 is a schematic illustration of an example controller 500 (or control system) that is operable, e.g., to control operations as described with reference to control system 999. The controller 500 is intended to include various forms of digital computers, such as printed circuit boards (PCB), processors, digital circuitry, or otherwise that is part of a vehicle. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The controller 500 includes a processor 510, a memory 520, a storage device 530, and an input/output device 540. Each of the components 510, 520, 530, and 540 are interconnected using a system bus 550. The processor 510 is capable of processing instructions for execution within the controller 500. The processor may be designed using any of a number of architectures. For example, the processor 510 may be a CISC (Complex Instruction Set Computers) processor, a RISC (Reduced Instruction Set Computer) processor, or a MISC (Minimal Instruction Set Computer) processor.

In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the controller 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the controller 500. In one implementation, the storage device 530 is a computer-readable medium. In various different implementations, the storage device 530 may be a floppy disk device, a hard disk device, an optical disk device, a tape device, flash memory, a solid state device (SSD), or a combination thereof.

The input/output device 540 provides input/output operations for the controller 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, for example, in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, solid state drives (SSDs), and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) or LED (light-emitting diode) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a control system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

What is claimed is:

1. A hazardous waste repository, comprising:
   a directional drillhole formed from a terranean surface into at least one subterranean formation of one or more subterranean formations, the at least one subterranean formation suitable for storing hazardous waste, the directional drillhole comprising:
   an access drillhole that comprises an entry at the terranean surface and extends substantially vertically toward the one or more subterranean formations,
   a curved portion coupled to the access drillhole, and
   a substantially horizontal drillhole portion coupled to the curved portion and extending into the at least one subterranean formation, the substantially horizontal drillhole portion comprising a storage region configured to store one or more hazardous waste canisters that is configured to enclose hazardous waste;
   a casing that extends to at or near the terranean surface, through the directional drillhole, and into the storage region of the substantially horizontal drillhole portion; and
   a monitor borehole formed from the terranean surface into the at least one subterranean formation adjacent the storage region, the monitor borehole sized to receive a measurement instrument run from the terranean surface to a portion of the monitor borehole adjacent the storage region, the measurement instrument configured to detect a distortion of the casing sufficient to prevent or impede extraction of the one or more hazardous waste canisters from the storage region of the substantially horizontal drillhole, through the curved portion and the access drillhole, and to the entry at the terranean surface.

2. The hazardous waste repository of claim 1, wherein the measurement instrument comprises one or more calipers configured to measure a distortion of the monitor borehole to detect the distortion of the casing.

3. The hazardous waste repository of claim 1, wherein the measurement instrument comprises at least one of a radiation sensor, a temperature sensor, or a salinity sensor.

4. The hazardous waste repository of claim 1, wherein the measurement instrument comprises an acoustic probe configured to record seismic waves scattered off the casing to detect the distortion of the casing.

5. The hazardous waste repository of claim 1, further comprising another measurement instrument configured for at least intermittent positioning in the storage region and to detect the distortion of the casing.

6. The hazardous waste repository of claim 5, wherein the another measurement instrument comprises at least one of an optical probe configured to capture one or more images of the storage region or a set of calipers.

7. The hazardous waste repository of claim 5, wherein the another measurement instrument comprises an acoustic probe configured to detect the distortion of the casing.

8. The hazardous waste repository of claim 7, wherein the acoustic probe comprises a fill material positioned in a hollow portion of the acoustic probe and at least one antenna section.

9. The hazardous waste repository of claim 5, wherein the another measurement instrument comprises a graded acoustic fiber configured to detect the distortion of the casing.

10. The hazardous waste repository of claim 1, further comprising at least one casing strap positionable on an exterior surface of the casing and configured to detect the distortion of the casing.

11. The hazardous waste repository of claim 10, wherein the casing strap comprises a conductive portion and a non-conductive portion that combine to form a circular member positionable on the exterior surface, the conductive portion electrically coupled through one or more wires to the terranean surface, the non-conductive portion comprising a breakable member configured to break based on the distortion of the casing.

12. A hazardous waste repository, comprising:
a directional drillhole formed from a terranean surface into at least one subterranean formation of one or more subterranean formations, the at least one subterranean formation suitable for storing hazardous waste, the directional drillhole comprising:
an access drillhole that comprises an entry at the terranean surface and extends substantially vertically toward the one or more subterranean formations,
a curved portion coupled to the access drillhole, and
a substantially horizontal drillhole portion coupled to the curved portion and extending into the at least one subterranean formation, the substantially horizontal drillhole portion comprising a storage region configured to store one or more hazardous waste canisters that is configured to enclose hazardous waste;

a casing that extends to at or near the terranean surface, through the directional drillhole, and into the storage region of the substantially horizontal drillhole portion; and a measurement instrument configured for at least intermittent positioning in the storage region and to detect a distortion of the casing, the measurement instrument comprising an acoustic probe configured to detect the distortion of the casing, the acoustic probe comprising a fill material positioned in a hollow portion of the acoustic probe and at least one antenna section.

13. The hazardous waste repository of claim 12, wherein the measurement instrument comprises at least one of an optical probe configured to capture one or more images of the storage region or a set of calipers.

14. The hazardous waste repository of claim 12, wherein the measurement instrument comprises a graded acoustic fiber configured to detect the distortion of the casing.

15. The hazardous waste repository of claim 14, wherein the graded acoustic fiber comprises a plurality of antenna sections located along a length that include the at least one antenna section.

16. The hazardous waste repository of claim 14, wherein the graded acoustic fiber comprises a velocity that changes as a function of a radius of the fiber.

17. The hazardous waste repository of claim 12, further comprising at least one casing strap positionable on an exterior surface of the casing and configured to detect the distortion of the casing.

18. The hazardous waste repository of claim 17, wherein the casing strap comprises a conductive portion and a non-conductive portion that combine to form a circular member positionable on the exterior surface, the conductive portion electrically coupled through one or more wires to the terranean surface, the non-conductive portion comprising a breakable member configured to break based on the distortion of the casing.

19. The hazardous waste repository of claim 12, further comprising a monitor borehole formed from the terranean surface into the at least one subterranean formation adjacent the storage region, the monitor borehole sized to receive another measurement instrument run from the terranean surface to a portion of the monitor borehole adjacent the storage region, the measurement instrument configured to detect a distortion of the casing.

20. The hazardous waste repository of claim 19, wherein the another measurement instrument comprises one or more calipers configured to measure a distortion of the monitor borehole to detect the distortion of the casing.

21. The hazardous waste repository of claim 19, wherein the another measurement instrument comprises at least one of a radiation sensor, a temperature sensor, or a salinity sensor.

22. The hazardous waste repository of claim 19, wherein the another measurement instrument comprises an acoustic probe configured to record seismic waves scattered off the casing to detect the distortion of the casing.

23. A hazardous waste repository, comprising:
a directional drillhole formed from a terranean surface into at least one subterranean formation suitable for storing hazardous waste, the directional drillhole comprising:
an access drillhole that comprises an entry at the terranean surface and extends substantially vertically toward the at least one subterranean formation,
a curved portion coupled to the access drillhole, and a substantially horizontal drillhole portion coupled to the curved portion and extending into the at least one subterranean formation, the substantially horizontal drillhole portion comprising a storage region configured to store one or more hazardous waste canisters that is configured to enclose hazardous waste;

a casing that extends to at or near the terranean surface, through the directional drillhole, and into the storage region of the substantially horizontal drillhole portion; and at least one casing strap positionable on an exterior surface of the casing and configured to detect a distortion of the casing, the casing strap comprising a conductive portion and a non-conductive portion that combine to form a circular member positionable on the exterior surface, the conductive portion electrically coupled through one or more wires to the terranean surface, the non-conductive portion comprising a breakable member configured to break based on the distortion of the casing.

24. The hazardous waste repository of claim 23, further comprising a measurement instrument configured for at least intermittent positioning in the storage region and to detect a distortion of the casing.

25. The hazardous waste repository of claim 24, wherein the measurement instrument comprises a graded acoustic fiber configured to detect the distortion of the casing.

26. The hazardous waste repository of claim 24, wherein the measurement instrument comprises at least one of an optical probe configured to capture one or more images of the storage region or a set of calipers.

27. The hazardous waste repository of claim 24, wherein the measurement instrument comprises an acoustic probe configured to detect the distortion of the casing.

28. The hazardous waste repository of claim 27, wherein the acoustic probe comprises a fill material positioned in a hollow portion of the acoustic probe and at least one antenna section.

29. The hazardous waste repository of claim 23, further comprising a monitor borehole formed from the terranean surface into the at least one subterranean formation adjacent the storage region, the monitor borehole sized to receive another measurement instrument run from the terranean surface to a portion of the monitor borehole adjacent the storage region, the measurement instrument configured to detect a distortion of the casing.

30. The hazardous waste repository of claim 29, wherein the another measurement instrument comprises one or more calipers configured to measure a distortion of the monitor borehole to detect the distortion of the casing.

31. The hazardous waste repository of claim 29, wherein the another measurement instrument comprises at least one of a radiation sensor, a temperature sensor, or a salinity sensor.

32. The hazardous waste repository of claim 29, wherein the another measurement instrument comprises an acoustic probe configured to record seismic waves scattered off the casing to detect the distortion of the casing.

33. The hazardous waste repository of claim 23, wherein the conductive portion comprises at least one of zinc, manganese, beryllium, or chromium, and the non-conductive portion comprises a ceramic.

* * * * *